Dec. 19, 1967    G. SCHLAPP ETAL    3,358,562
TRACING MECHANISM FOR DUPLICATING MILLING MACHINES
Filed Nov. 7, 1966    8 Sheets-Sheet 1

Inventors
Georg Schlapp
Paul Kohl
BY Bailey, Stephens & Huettig
ATTORNEYS Fig. 17
Fig. 16

Inventors
Georg Schlapp
Paul Kohl
BY Bailey, Stephens + Huettig
ATTORNEYS

Fig.18

United States Patent Office 3,358,562
Patented Dec. 19, 1967

3,358,562
TRACING MECHANISM FOR DUPLICATING MILLING MACHINES
Georg Schlapp and Paul Kohl, Langen, near Frankfurt am Main, Germany, assignors to Nassovia Werkzeugmaschinenfabrik G.m.b.H., Langen, near Frankfurt am Main, Germany
Filed Nov. 7, 1966, Ser. No. 592,354
16 Claims. (Cl. 90—62)

This invention relates to a tracing mechanism for a duplicating milling machine which operates under the principle of advance control as broadly described in Kohl, U.S. Patent No. 3,241,455. Such an advance control is also described in the copending application of Schlapp, Ser. No. 553,572, filed May 27, 1966, for "Tracing Mechanism for Duplicating Milling Machines." In the aforesaid application, the machine for operating in the principle of advance control has a measuring head driven clockwise or counterclockwise around a measuring element mounted on the upper end of the tracer rod. This mechanism automatically guides the tracer on the pattern under the effect of the advance force. Two electric impulse transmitters are mounted in the measuring head and which, in connection with the measuring element such as a ball or a ring, electronically controls the rotation of the measuring head either clockwise or counterclockwise as soon as the pattern contour deviates from the contact tangent between the tracer and pattern and stops the rotation when the contact tangent coincides with the pattern contour. Three electrical contact switches are mounted on the front of the measuring head equally around a circle with the center contact being diametrically opposite a spring-pressed pressure member on the measuring head and acting as a centralizing leg.

In this arrangement, it is important that the centralizing leg be exactly positioned for transmitting the advance control force since otherwise, because of the small distance between the measuring ball and the measuring circle, it is not possible to keep a constant relation between the measuring ball and the center contact. Also, the size of the angle between the direction of the advance control force and the contact tangent cannot be changed.

The objects of this invention are to improve on the above-described mechanism so as to avoid an incomplete switching between the measuring head and the measuring element on the tracing rod and also to produce a mechanism in which the angle between the direction of the advance control force and the contact tangent can be adjusted.

In general, these objects are obtained by using an electric switch as the impulse transmitter which is mounted on the measuring head. This switch is activated by the pressure element which bears on the measuring element. The switch can be actuated in two directions for starting the rotation of the measuring head, either clockwise or counterclockwise, and has a neutral position in which no rotation takes place. Support members are provided in the measuring head for restricting the outward movement of the measuring element, such as a ball or ring, which members are so positioned that when contacted by the measuring element the switch assumes its neutral position. Rollers are used as the support members and are mounted on the front of the measuring head 60° on each side of the switch. The support member rollers coordinate definitely the measuring element with the impulse transmitter so that incomplete or incorrect switching is avoided.

This electric switch has two pairs of contacts insulated from each other and which are open in the neutral position of the switch. In the switching either a contact is always open and the other one has an insulating effect in such a manner that it keeps another contact closed. When spring switch contacts are used, one pair of contacts is always closed and both pairs of contacts are always closed in the neutral position of the switch.

In one form of the invention, the switch is composed of a spring-pressed contact pin extending through a socket in the measuring head transverse to the axis of rotation of the measuring head and directed toward the center of the measuring element. This pin forms on its end touching the measuring element one pair of contacts and has on its other end a flat flange which is engageable with a terminal disc lying on the insulated socket to form a second pair of contacts. Each pair of contacts has its own control line and each is connected to a relay with which they operate in such a manner that, when the contact tangent between the tracer and pattern coincides with the pattern contour, the measuring head is stopped, and when an outward movement of the tracer rod produces a deviation between the contact tangent and pattern contour, either of the pairs of electrical contacts are closed so that a clockwise or counterclockwise rotation of the measuring head is started.

The socket holding the pin on the measuring head is adjustable in its distance from the measuring element for selecting varying contact distances. This makes it possible to change the angle the direction of the contact force forms with the contact tangent between the tracer and the pattern by changing the contact distance.

The measuring head can be driven by a reversing electrical motor or with an electromagnetic reversing coupling.

In order to change the tracing line direction, an electrical time delay relay is inserted in the control line of the switch pin for opening a reversing switch to change the direction of rotation of the measuring head and retarding the closing time of the reverse switch by the amount of time required by the measuring head in its original direction in order to take a position the advance force indicates for a changed line direction.

The means by which the objects of the invention are obtained are described more fully with reference to the accompanying drawings in which.

Figure 1:
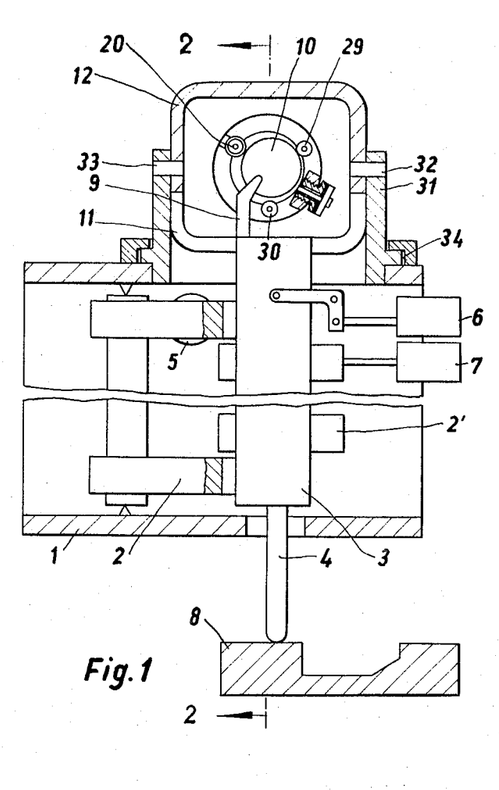
FIGURE 1 is a cross-sectional view through the mechanism of this invention.
Figure 2:
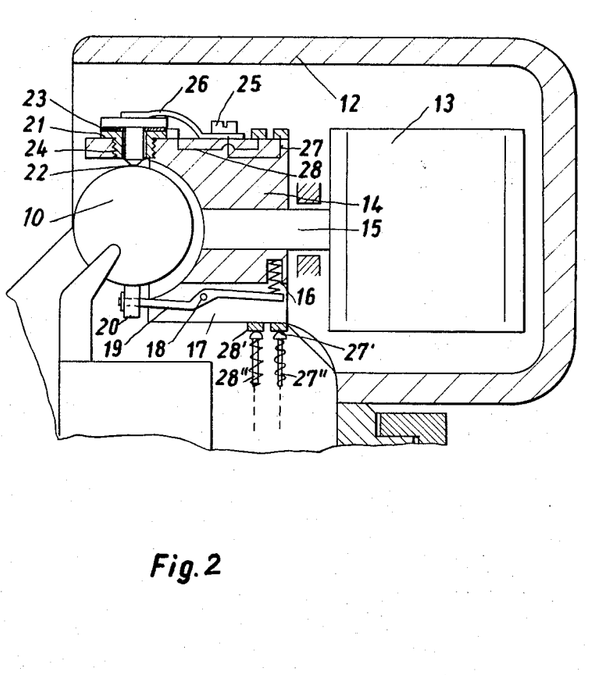
FIGURE 2 is a cross-sectional view taken on the line 2—2 of FIGURE 1.

As shown in FIGURES 1 and 2, the housing 1 contains bifurcated levers 2 and 2' connected to a tracing rod 3 having a sensing pin 4 and joined to hydraulic control valves 5, 6 and 7 for starting the movements of the workpiece sleds, not shown, in three dimensions. Rod 3 can be moved parallel in any direction and valves 5, 6 and 7 actuate the workpiece sleds in accordance with the distance and direction of the outward movement of rod 4. In place of the parallel rod movement, a mechanism can be used having angular outward movement of the rod 4 as disclosed in aforesaid application S.N. 553,572. The advance control mechanism automatically keeps sensor pin 4 in constant contact with the pattern 8. An arm 9 on the top of the rod 3 holds a measuring element in the form of a ball 10 within the housing 12 of the advance control mechanism. Within housing 12 is reversing electric motor 13 which drives a measuring head 14 by means of drive shaft 15. This measuring head surrounds ball 10 and tries to force it into a constantly eccentric position with respect to the measuring head. A spring 16 mounted in a groove 17 urges a lever 19 pivoted at 18 against ball 10 and constitutes the pressure element. A roller 20 on the end of lever 19 acts as the pressure roller actually bearing against ball 10. The arrangement is such that the pressure of roller 20 extends through the center of ball 10 and diametrically opposite the center line of an insulating socket 21 which contains a switch pin 22. This pin extends transversely of the longitudinal axis of rotation of the measuring head and has a flat flange on its end opposite the end touching ball 10. Mounted between this flat flange end and socket 21 is an electric contact terminal 23. The ball, together with the pin, socket and terminal, constitutes the electrical switch S of FIGURE 3. Socket 21 is threaded into the measuring head and can be adjustable from the outside by means of a pin key, not shown in detail, and can be secured by means of a set screw. The terminal 23 is fixed to the upper side of the socket and is insulated by the socket from the pin 22. A screw 25 fastens a leaf spring 26 on the measuring head to urge pin 22 constantly against ball 10. Electric lines 27 and 28 for pin 22 and the terminal 23 lead to connecting rings 27' and 28' where they are engaged by brushes 27" and 28", respectively, for transmitting impulses to the electric control apparatus shown in the circuits of FIGURES 3a, 3b and 3d. Two freely rotatable support member rollers 29 and 30 are mounted on the front end of the measuring head for the purpose of restricting the movement of the measuring element ball 10. These rollers each lie at an angle of 60° on the side of pin 22. The measuring circle of the measuring head has a diameter which is greater than the diameter of the ball 10 by a distance twice the distance the tracer is movable from its center position. For example, if the distance the racer is movable from its center position is 0.2 mm., then the diameter of the measuring circle is 0.4 mm. larger than the diameter of ball 10.

Housing 12, as also disclosed in aforesaid application S.N. 553,572, is removably mounted in the part 31 of the housing 1 by pivot pins 32 and 33 so that it can be turned to any angle while part 31 is rotatable around the longitudinal axis of tracer rod 3 by means of the guide flange 34.

Figures 3A, 3B:
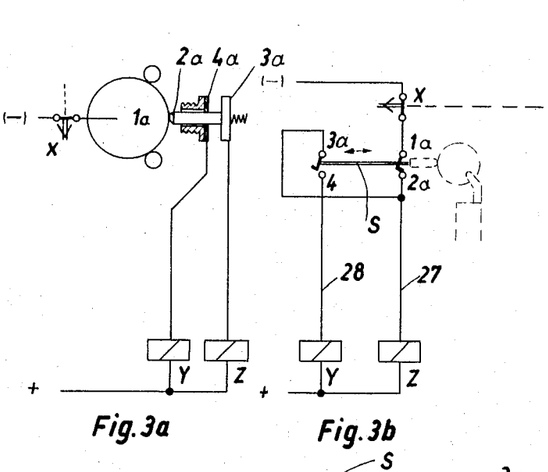
FIGURE 3a, 3b, and 3d are circuit diagrams of the switching circuits
Figure 3C:
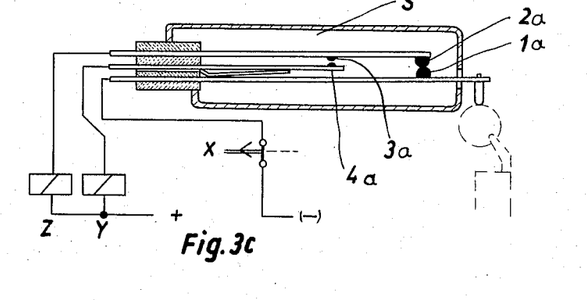
FIGURE 3c is a cross-sectional view through a spring-laid switch.

FIGURES 3a, 3b, 3c and 3d show the electric switching circuits for the advance control mechanism. The electric switch in FIGURE 1 composed of the parts 10, 21, 22 and 23 is represented in FIGURE 3a as the parts 1a, 2a, 3a and 4a. These parts from the switch S modified forms of which are shown in FIGURES 3b and 3c. The contact fingers of the switch S in FIGURE 3b are constructed as openers with shielding such that they are closed in the center or neutral position. Contacts 3a and 4a are open when switching to the left (counterclockwise rotation of the measuring head) while contacts 1a and 2a are closed. However, in switching to the neutral position or right (clockwise), contacts 1a, 2a are open and contacts 3a, 4a are closed. The electrical control lines 27 and 28 joined to the contacts 2a and 4a, respectively, are each connected to a relay Y and Z, respectively, to the plus pole of a direct current source. While contact 3a is directly connected to line 27, contact 1a is coupled to a time delay relay X to the minus pole of the direct current source.

Figure 3D:
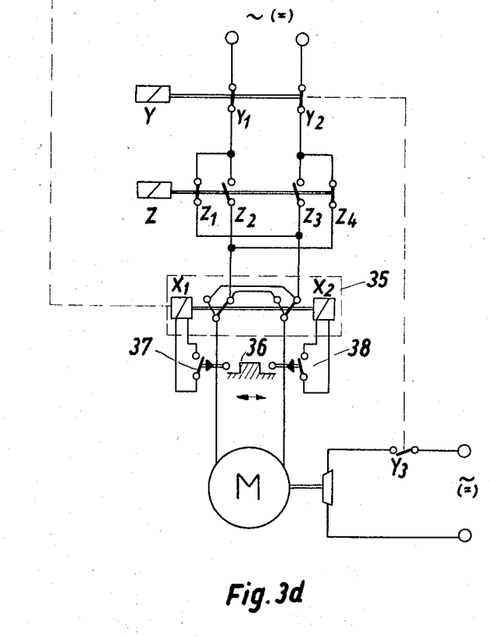

FIGURE 3c is a modified form of the electric switch. The contacts correspond in function to those in FIGURES 3a and 3b but they are constructed as flat spring finger contacts. The manner of operation of the switch and relays Y and Z shown in FIGURES 3a, 3b and 3c with regard to standstill, clockwise or counterclockwise roation of the motor M, drive the measuring head as shown in the circuit of FIGURE 3d. This circuit has the contacts of the relays Y and Z and a contact circuit 35 for the reversing of the rotation of the motor. This operation is described in more detail with reference to FIGURES 4 to 12.

The switch positions in FIGURES 3a, 3b and 3c are identical. Contacts 1a and 2a are always closed and contacts 3a and 4a are open. This position of the contacts corresponds to the largest outward movement distance of the tracer rod 3 and in which the measuring head shows the largest eccentricity to the measuring circle, that is, lies engaged with the support rollers. If the sensor pin 4 in this position of the measuring ball has no contact with the pattern, then the advance control mechanism is pretty near in a tracer idling position in which the measuring head rotates in one direction and the measuring ball with the sensor pin to form a circling movement in the plane of the drawing of FIGURE 1. Assuming that the measuring head in this idling position is rotating clockwise as in FIGURE 5, the contacts 1a and 2a are closed and the contacts 3a and 4a are open, note FIGURES 3a, 3b and 3c. No current flows to the relay and its contacts Y1 and Y2 are closed and Y3 is open. As already mentioned, this produces a clockwise rotation of the motor M and the measuring head. Now, when the sensor pin is moved manually or mechanically from its idling position to the pattern, as in FIGURE 4, it is actually displaced from its starting position and the ball 10 is forced against roller 29 so that the switch is brought into its neutral position in which all contacts 1a, 2a, 3a and 4a are closed. At this moment, the contact tangent between the tracer and pattern coincides with the contour pattern. Relay Y is actuated and contacts Y1 and Y2 are opened, thus interrupting the motor current and contact Y3 is closed to actuate the motor braking mechanism which is symbolically indicated in FIGURE 3 in order to immediately stop the motor. The brake mechanism can grab the motor shaft 15 as in a magnetic brake or it can act directly on the motor winding. The measuring head is stopped and the small outward movement of the tracer rod effected by the advance force moves the hydraulic control valve 7 of FIGURE 1 for the forward movement in a longitudinal line direction and whereby the sensor pin and workpiece sled are moved from left to right on the pattern and/or workpiece. The advance force effective on the pattern in the direction of the arrow (FIGURE 4) forms a contact tangent angle of about 30° between the tracer and the pattern.

Figure 4:
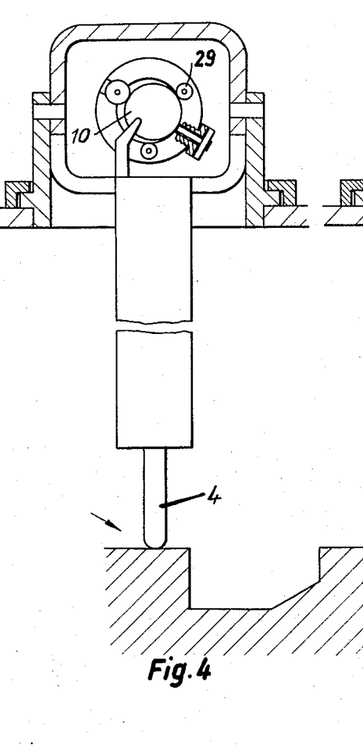
FIGURES 4 to 12, respectively, are views similar to FIGURE 1 showing various positions of the measuring head while tracing different contours on the pattern.
Figure 5:
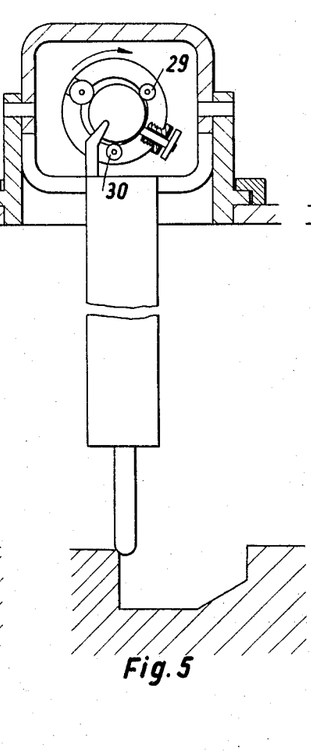
Figure 6:
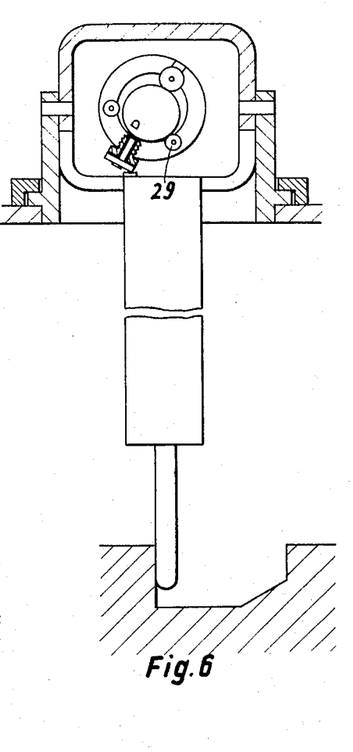
Figure 7:
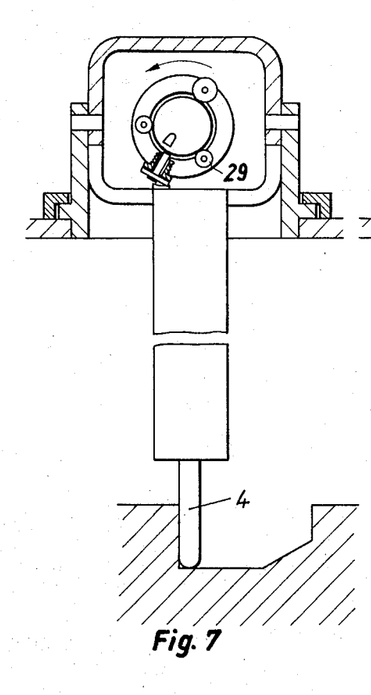
Figure 8:
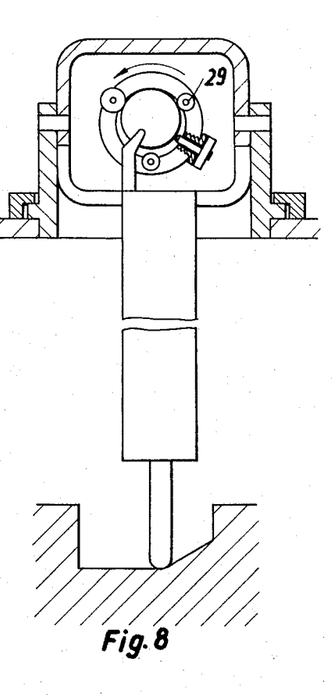
Figure 9:
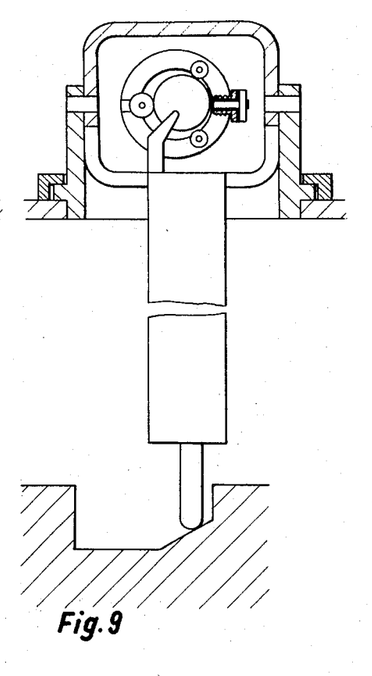
Figure 10:
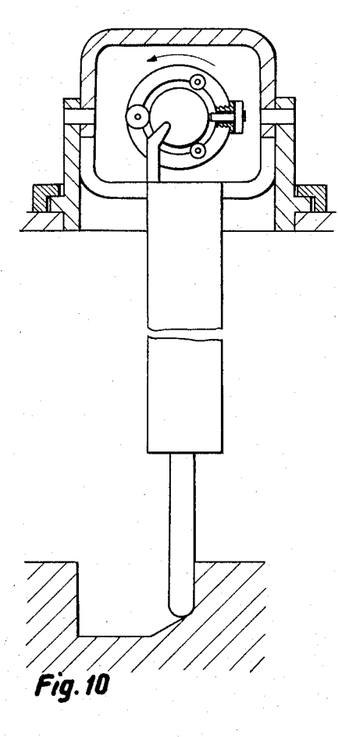
Figure 11:
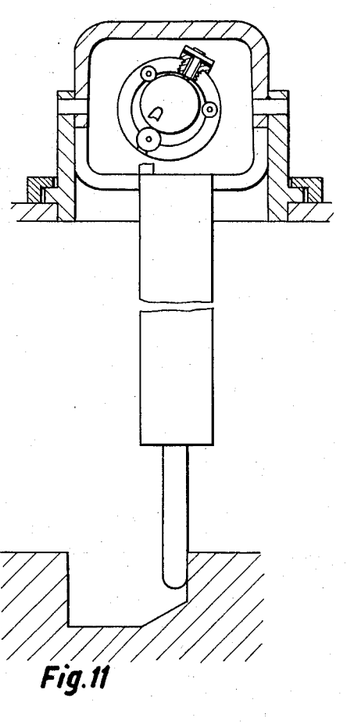
Figure 12:
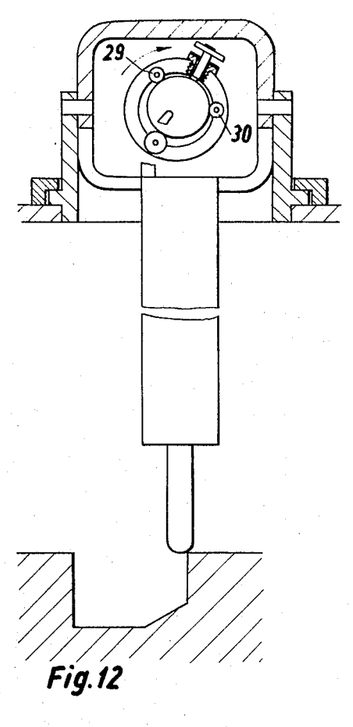

As soon as the sensor pin reaches the right angle corner in FIGURE 5, it is moved outward by the advance force so that the ball 10 bears on both support rollers 29 and 30. The switch comes out of its neutral position as the contacts 3a and 4a are opened and while contacts 1a and 2a remain closed. Relay Z remains active and relay Y is again activated so that its contacts Y1 and Y2 close and contact Y3 opens. The motor brake is released and current restored to the motor M. The motor and measuring head are rotated clockwise for such a time until the angle size which the direction of the advance force forms with the contact tangent between the tracer and pattern is again restored. This happens when the measuring head has taken the position shown in FIGURE 6. Ball 10 is again forced against the roller 29 and switch S returns to neutral position in which the contacts 1a, 2a, 3a and 4a are again closed. Therefore, the motor and measuring head are stopped because of the effect of the relays as described for FIGURE 4. When the sensor pin contacts the horizontal base of the contour as in FIGURE 7, it is forced back relative to its direction of movement to the advance and takes up a so-called zero position in which the ball 10 is positioned concentric to the measuring circle and the advance is neutralized. The switching element, as pin 22 (FIGURE 2) or 2a (FIGURE 3) loses contact with ball 10 and the switch is changed into a position opposite to the one in FIGURE 5 and in which contacts 1a, 2a are open and contacts 3a, 4a remain closed. Current to relay Z is cut off and its contacts Z1, Z4 open and Z2, Z3 close. The motor connections are thus exchanged and the measuring head is driven counterclockwise. As soon as the position of the measuring head, as shown in FIGURE 4, is achieved, the measuring head comes to a halt because the advance force forces ball 10 against roller 29 and contacts 1a, 2a are again closed. Thus, as described for FIGURES 4 and 6, relay Y is activated and the motor stopped. Pin 4 now moves along the bottom surface of the contour until it reaches the inclined contour as shown in FIGURE 8. Pin 4 is thus once again moved outward relative to its direction of movement so that contacts 1a and 2a are open. Now the same procedure as described for FIGURE 7 is followed and the measuring head is rotated counterclockwise and this continues until the contact tangent again coincides with the contour of the pattern. At this moment, the switch again takes the neutral position which stops rotation of the measuring head. Because of the outward movement of the pistons in the valves 6 and 7, the sensor pin is now moved along the inclined contour as shown in FIGURE 9. The advance force produced by pressure elements 16 and 20 is again directed at an angle of about 30° to the contact tangent to hold the sensor pin on the pattern. As soon as the sensor pin moves against the vertical wall of the contour as in FIGURE 10, a relative outward movement of the sensor takes place relative to its direction of movement and in which the sensor pin is pushed back to its zero position by the amount of the advance. All control pistons 6 and 7 at this time have no outward movement. Contacts 1a and 2a are open and contacts 3a, 4a remain closed. Relay Z is currentless as in FIGURES 7 and 8, and the motor and measuring head rotate counterclockwise. In the pin position of FIGURE 11, the switch is again in its neutral position in which the measuring head is stopped. The sensor pin traces the vertical contour upwardly, and at the moment of its outward movement on the upper edge of the pattern, as shown in FIGURE 12, the contact tangent changes again and the ball 10 is forced against rollers 29 and 20 so that the switch contacts 1a and 2a are closed and contacts 3a and 4a open. Relay Z is activated so that contacts Z1, Z2, Z3 and Z4 take their positions as shown in FIGURE 3d. Now, as in FIGURE 5, the measuring head rotates clockwise until the measuring head reaches the position shown in FIGURE 4. Pin 4 now moves along the surface of the pattern to the right until its sled contacts a reverse switch such as a stop switch for the reversal of the line direction. This switch 35 is schematically shown in FIGURE 3d. Also shown is a cam 36 on the tracer head sled which is engageable with two stop switches 37 and 38 on the machine stand. If the tracer head sled now moves toward stop switch 37, then simultaneously the time delay switch Z is opened and a magnet X1 energized whereby the relay Z is de-activated and a counterclockwise rotation of the measuring head prevented by the simultaneous reversal of the motor by means of the switch 35 to produce a clockwise rotation. Motor and measuring head rotate clockwise until the measuring head reaches a position in which the advance force direction points in the opposite direction of the line as in a position corresponding to that of FIGURE 7. The time delay switch Z again closes and measuring head automatically is placed in its advanced position in which the advance force again assumes the desired angle between the sensor and pin which corresponds to the mirror image of the measuring head, as in FIGURE 4, in order to introduce the tracing movement of the sensor pin in the changed direction of line from right to left in the same manner as described above.

Figures 13, 14, 15:
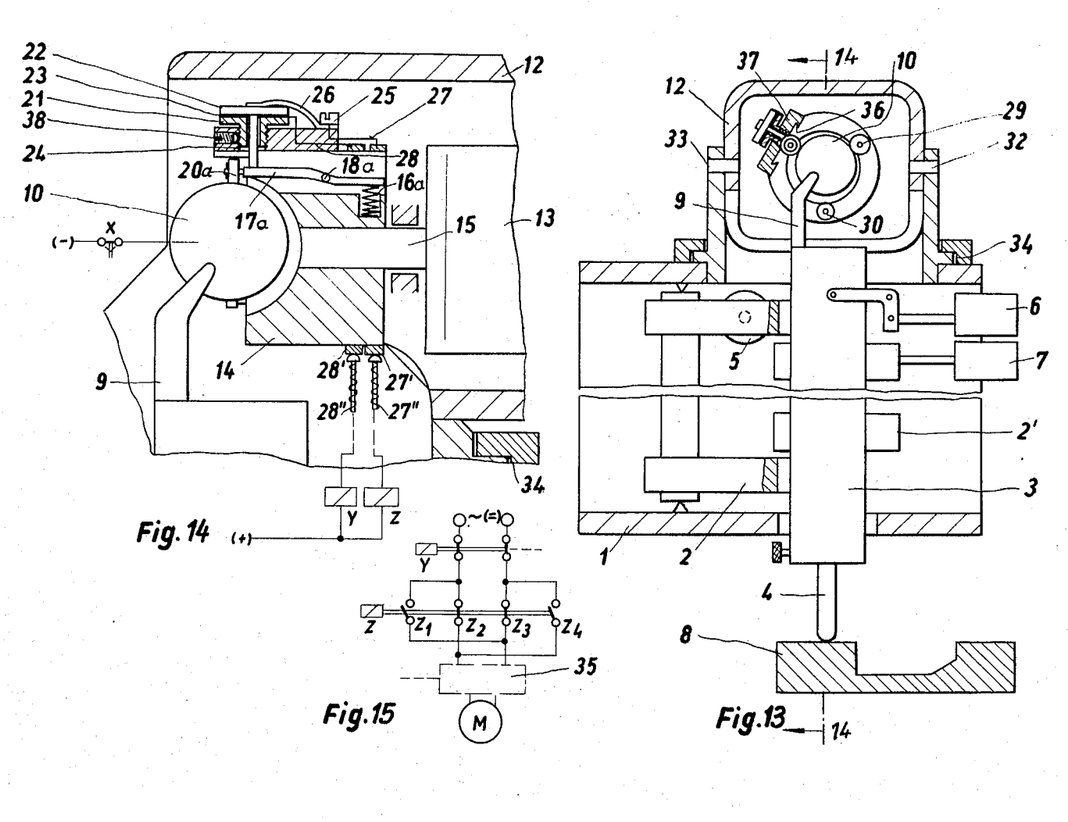
FIGURE 13 is a view similar to FIGURE 1 of a modified form of the invention.
FIGURE 14 is a cross-sectional view taken on the line 14—14 of FIGURE 13.
FIGURE 15 is a circuit diagram for the switching circuit of FIGURES 13 and 14.

In the modification of FIGURES 13, 14 and 15, the switch composed of the parts socket 21, pin 22 and terminal disc 23 is held by a threaded joint 24 into a member 37 and secured to the measuring head by a dovetail joint 36. Thus the pin 27 can be adjusted both longitudinally of the axis of the shaft 15 and transversely thereof. The socket can be prevented from turning by means of the set screw 38. The free end of pin 7 presses on a lever 17a mounted on pivot pin 18a and under the pressure of a spring 16a so that the end of the lever containing the roller 20a which bears on the ball 10 constitutes the pressure element for producing the advance force to the ball 10. Roller 20a extends toward the center of ball 10 and reduces friction by being freely rotatable. Support rollers 29 and 30 are mounted on the front side of the measuring head and are each spaced at an angle of 120° on opposite sides of roller 20a. By transversely displacing the socket 21 or moving it longitudinally of the axis of shaft 15, it is possible to change the size of the angle of the contact tangent between the tracer and the pattern.

For proper functioning, it is required that the switch can be actuated in two directions for the clockwise or counterclockwise rotation of the measuring head and a neutral position with closed contacts and no rotation. The principle is the same as described for FIGURES 1 to 12. However, in the modification of FIGURES 13 to 15, the position of the open and closed contacts is exactly reversed. In order to obtain the functional coordination corresponding to the outward movement of the tracer of the direction of the rotation of the measuring head with respect to the position of the electric contacts, it is only necessary to change the adjustment of the contacts of the relay Z such as shown in FIGURE 15. The contacts Z1, Z4 and the closed contacts 22 and 23 correspond to this changed adjustment when the relay Z is activated. With the contacts so adjusted, the mechanism has the same effect on the advance control mechanism as described for FIGURES 1 to 12. The only difference is in that the open contacts in the switch are reversed so that an outward movement of the tracer in the plane of the drawing in the direction down corresponds to contacts 22 and 23 being closed and contacts 22 and 17a being open, and an outward movement of the tracer takes place with the contacts 22 and 23 open and contacts 22 and 17a closed. The line reversal direction is accomplished as described for FIGURES 1 to 12.

Figures 16, 17:
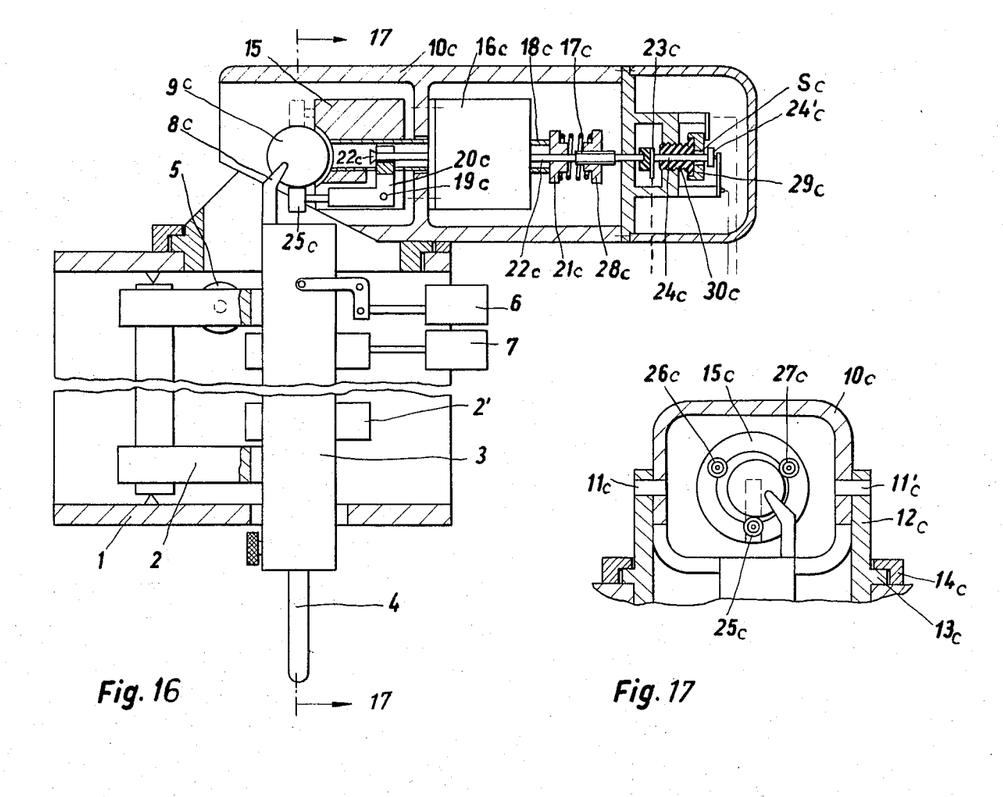
FIGURE 16 is a view similar to FIGURE 1 of a further modified form of the invention.
FIGURE 17 is a cross-sectional view taken on the line 17—17 of FIGURE 16.
Figure 18:
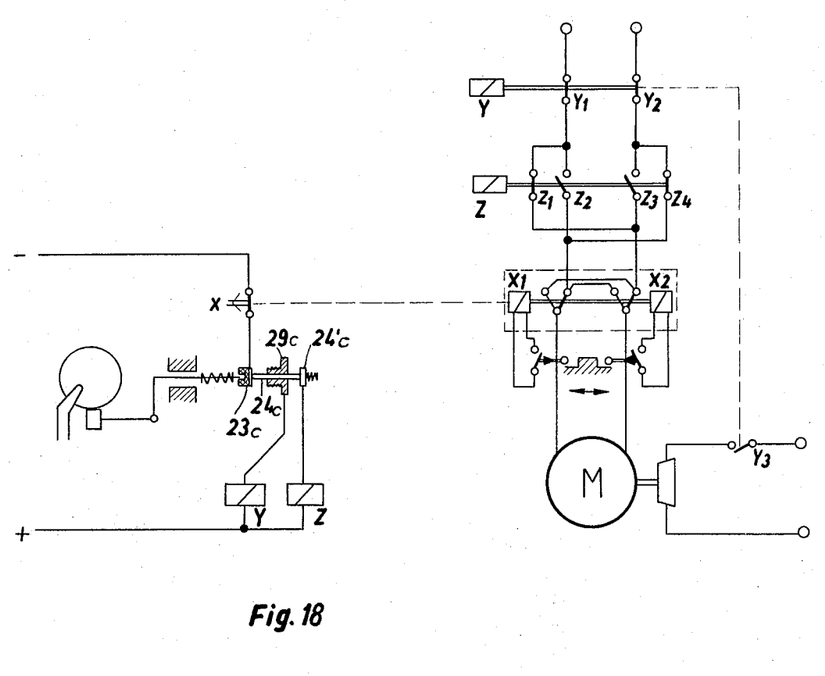
FIGURE 18 is a circuit diagram for the switching in FIGURES 16 and 17.

In the modification of FIGURES 16 to 18, the collecting rings 27′ and 28′ of FIGURE 2 are eliminated and the switch is such that it is available for inspection and adjustment while the machine is running. This modification also has a greater safety factor and a reduction in wear.

The measuring elements such as the ball 9c is fastened on an arm 8c on the top of the tracer rod with the center point of the ball lying on the axis of the rod. The measuring head and ball are enclosed in the housing 10c which is pivotal around pivot points 11c and 11′c mounted in the housing part 12c which is turnable on a flange 13c in a guide 14c. The measuring head 15c is driven by an electric motor 16c, which together with the pressure spring 17c is joined to an electrical switch Sc. The measuring head 15c is joined to the motor 16c by a hollow drive shaft 18c and into which extends one end of a crank lever 10c pivotable around a pin 19c. The end of the lever within the hollow shaft is joined to a rod 22c which is slidable in a flange bearing 21c which closes the end of the hollow shaft. An insulating member 23c joins the rod 22c with the pin 24c of the electrical switch. Crank lever 20c is extended into a pressure roller 25c which bears upon the ball 9c and constitutes the pressure element. Support rollers 26c and 27c lie on each side of the roller 25c at an angle of about 120° and form the measuring circle. As in FIGURES 1 to 12, the outward advance of the tracing pin from its center position is 0.2 mm. which gives the measuring circle a diameter which is 0.4 mm. larger than the diameter of the ball 9c. Pressure spring 17c bears between socket 21c and an adjusting nut 38c threaded on rod 22c for producing the advance force. Thus by way of lever 20c, the roller 25c always urges ball 9c into an eccentric position with respect to the measuring circle, that is, in advance position, and on the other hand, when the machine is idling, opens the contact between pin 24c and contact 29c.

The pressure on spring 17c and thus the amount of the advance force is changeable by means of the adjusting nut 28c.

Pin 24c is held by a socket 30c which is threaded into the housing of the advance control mechanism and fastened by a set screw, not shown. By loosening the set screw and axially displacing the socket 30c, the distance between the contacts 23c, 24c and 24'c, 29c of the switch is changed and thus the tangent angle between the tracer and pin is changed. In place of the pin 24c, a switch such as shown in FIGURE 3c can be used.

The simplified circuit diagram of FIGURE 18 is for the functioning of the electric switch with regard to the measuring head drive. The principle is the same as that of FIGURES 1 to 12 with the exception that the minus pole of the direct current source is not applied to the measuring ball but is directly applied to the contact 23c and insulated from the machine. The electric control lines connected to the contacts 24'c and 29c each lead to a relay Y and Z, respectively, and to the plus pole of the direct current source, and the contact positions of the relays Z1, Z2, Z3 and Z4 correspond to the positions shown in FIGURE 3.

In the switch Sc of FIGURES 16 to 18, the contacts 23c and 24c are closed and contacts 24'c and 29c are open during the largest outward movement of the tracing pin and in which the ball 9c is at its greatest eccentricity with respect to the measuring circle, that is, the ball engages both support rollers. If the sensor pin does not contact the pattern in this position of the measuring ball, then the advance control mechanism is in the tracer idling position, that is, the measuring head rotates in one direction around the measuring ball and thus the tracing pin executes a circling movement in the plane of the drawing as, for example, a clockwise rotation. In this switching position, relay Y is without current and its contacts Y1 and Y2 are closed while Y3 is open, note FIGURE 3. Relay Z is energized so that its contacts Z1 and Z4 are closed and contacts Z2 and Z3 open. If the tracing pin is moved manually or by engagement with the pattern, the idling position is left and contacts 24'c and 29c close. This activates the relay Y so that its contacts Y1 and Y2 open and its brake contact Y3 for stopping the motor closes. Thus the rotation of the measuring head is stopped. Relay Z remains activated and the switch is in its neutral position. If the tracing pin is moved outwardly still further, as on a rising or inclined contour, the contacts 24c and 29c remain closed, but contacts 23c and 24c are opened so that the relay Z and the relay Y are without current, whereby contacts Z1 and Z4 close and contact Y3 opens. The motor connections in this manner are exchanged, the brake is released and the measuring head is driven counterclockwise. These switching positions and the effect of the electrical switch are the same as for FIGURES 1 to 12.

The measuring element mounted on the upper end of the tracing rod can be in the form of a ball, a ring or a bolt. When a bolt is used, then the measuring head is constructed as a stop ring which surrounds the bolt and restricts its outward movements and the stop ring is provided with support rollers which lie in front of the bolt.

Having now described the means by which the objects of the invention are obtained,

We claim:
1. In a duplicating machine tool having a tracer adapted to follow a pattern, a measuring element mounted on said tracer, an advance control mechanism having a measuring head rotatably engageable with said element for forcing said tracer in constant engagement with the pattern and automatically determining the advance direction as a function of the contact tangent between the tracer and pattern, electrical switch means in said measuring head for transmitting pulses to an electronic control for rotating said head clockwise or counterclockwise as soon as the pattern contour deviates from the contact tangent and for stopping rotation when the contact tangent corresponds with the pattern contour, pressure element means in said head and bearing on said measuring element for producing the advance force by activating said switch means for rotating said head in either direction or in a neutral position for stopping the rotation, and support member means on each side of said switch means to restrict movement of said measuring element and for placing said switch means in neutral position when either support member means engages said measuring element.

2. In a tool as in claim 1, said switch means comprising two pairs of contacts which are open in the neutral position, and at least one pair of which is closed when said switch means is actuated.

3. In a tool as in claim 1, said switch means comprising a pin extending transversely of the measuring head axis and toward the center of said measuring element and in electrical contact therewith to form a first pair of electrical contacts, a flat head on said pin, an insulating socket surrounding said pin, a disc terminal insulated from said pin by said socket and engageable with said flat head to form a second pair of contacts, and relay means for each pair responsive to the closing of both pairs of contacts for stopping the rotation of the measuring head when the tangent angle between tracer and pattern coincides with the pattern contour, and upon change in said angle produces rotation in either direction upon the closing of either the first or the second pair of contacts.

4. In a tool as in claim 3, further comprising means for adjusting said socket relative to its distance from the center of said measuring element.

5. In a tool as in claim 1, said support member means comprising rollers mounted on the front of said measuring head and spaced 60° from said switch means.

6. In a tool as in claim 1, further comprising reversible electric motor means activatable by said switch means for rotating said measuring head.

7. In a tool as in claim 6, further comprising time delay means coupled to said switch means for opening a reverse switch to change the direction of rotation of said measuring head and retarding the closing of the reverse switch by the amount of time required by the measuring head for continued rotation in its original direction in order to take a position the advance force indicates for a changed line direction.

8. In a tool as in claim 1, said pressure element means being mounted between said measuring element and said switch means.

9. In a tool as in claim 8, said pressure element means comprising a lever engageable with said switch means, and a roller on said lever and bearing on said measuring element.

10. In a tool as in claim 9, further comprising means for adjusting said switch means both in the direction of the longitudinal axis of said measuring head and transversely thereof.

11. In a tool as in claim 1, further comprising a housing for said measuring head, and said switch means including an electrical switch mounted in said housing and joined to said pressure element means.

12. In a tool as in claim 11, further comprising a hollow drive shaft for said measuring head, a rod slidably mounted in said shaft and having one end engageable with electric switch, said pressure element means comprising a crank joined to said lever and bearing on said measuring element, and spring means on said rod for urging said crank to bear on said measuring element.

13. In a tool as in claim 12, further comprising set screw means for adjusting the pressure of said spring means.

14. In a tool as in claim 13, further comprising a pressure roller on the end of said crank bearing on said measuring element, and said support member means comprising a pair of support rollers mounted on said measuring head 120° on opposite sides of said pressure roller.

15. In a tool as in claim 14, said measuring element comprising a ball.

16. In a tool as in claim 14, said measuring head comprising a bolt and said measuring element comprising a ring surrounding said bolt.

References Cited
UNITED STATES PATENTS 2,796,806   6/1957   Schlapp.
3,241,455   3/1966   Kohl.

GERALD A. DOST, *Primary Examiner*.